US006502283B1

(12) United States Patent
Aguirre

(10) Patent No.: US 6,502,283 B1
(45) Date of Patent: Jan. 7, 2003

(54) CANE CLIP ATTACHMENT

(76) Inventor: Chuck J. Aguirre, 955 Galatea St., Azusa, CA (US) 91702

(*) Notice: Subject to any disclaimer, the term of this patent is extended or adjusted under 35 U.S.C. 154(b) by 0 days.

(21) Appl. No.: 09/948,740

(22) Filed: Sep. 7, 2001

(51) Int. Cl.$^{7}$ .......................... A44B 18/00; F16M 13/00

(52) U.S. Cl. .................. 24/3.11; 248/205.2; 248/316.7; 24/306; 135/65

(58) Field of Search ............................ 24/3.2, 3.7, 3.11, 24/3.12, 3.13, 306, 508, 509, 510, 500; 248/316.7, 305, 306, 205.2, 214, 216.4, 218.4, 229.17; 135/65, 68

(56) References Cited

U.S. PATENT DOCUMENTS 3,914,828 A 10/1975 Noda
3,987,807 A * 10/1976 Varnell ........................ 135/66
4,300,742 A 11/1981 Hunn
4,605,190 A * 8/1986 Kamp ..................... 248/316.7
4,639,980 A * 2/1987 Peterson ...................... 24/306
4,883,290 A * 11/1989 Landa ........................ 280/814
4,895,330 A 1/1990 Anstead
4,958,758 A 9/1990 Tipple et al.
5,000,418 A 3/1991 Vogt
5,456,437 A * 10/1995 Chander et al. ......... 248/316.7
D366,610 S 1/1996 Blumenaus
5,771,910 A * 6/1998 Kluttz ......................... 135/68
5,960,520 A * 10/1999 Conway et al. ............... 24/306
6,138,976 A * 10/2000 Fahringer, Sr.

* cited by examiner

*Primary Examiner*—Robert J. Sandy

(57) ABSTRACT

A cane clip attachment for securing a cane to a user's clothing when not using the cane. The cane clip attachment includes a clip member being adapted to be attached to a cane and being adapted to clip upon clothing of a user; and also includes cane-attaching members for attaching the clip member to the cane.

12 Claims, 3 Drawing Sheets

CANE CLIP ATTACHMENT

BACKGROUND OF THE INVENTION

1. Field of the Invention

The present invention relates to cane clip attachments and more particularly pertains to a new cane clip attachment for securing a cane to a user's clothing when not using the cane.

2. Description of the Prior Art

The use of cane clip attachments is known in the prior art. More specifically, cane clip attachments heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,958,758; 4,300,742; 5,000,418; 4,895,330; 3,914,828; and U.S. Pat. No. Des. 366,610.

While these devices fulfill their respective, particular objectives and requirements, the aforementioned patents do not disclose a new cane clip attachment. The inventive device includes a clip member being adapted to be attached to a cane and being adapted to clip upon clothing of a user; and also includes cane-attaching members for attaching the clip member to the cane.

In these respects, the cane clip attachment according to the present invention substantially departs from the conventional concepts and designs of the prior art, and in so doing provides an apparatus primarily developed for the purpose of securing a cane to a user's clothing when not using the cane.

SUMMARY OF THE INVENTION

In view of the foregoing disadvantages inherent in the known types of cane clip attachments now present in the prior art, the present invention provides a new cane clip attachment construction wherein the same can be utilized for securing a cane to a user's clothing when not using the cane.

The general purpose of the present invention, which will be described subsequently in greater detail, is to provide a new cane clip attachment which has many of the advantages of the cane clip attachments mentioned heretofore and many novel features that result in a new cane clip attachment which is not anticipated, rendered obvious, suggested, or even implied by any of the prior art cane clip attachments, either alone or in any combination thereof.

To attain this, the present invention generally comprises a clip member being adapted to be attached to a cane and being adapted to clip upon clothing of a user; and also includes cane-attaching members for attaching the clip member to the cane.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cane clip attachment which has many of the advantages of the cane clip attachments mentioned heretofore and many novel features that result in a new cane clip attachment which is not anticipated, rendered obvious, suggested, or even implied by any of the prior art cane clip attachments, either alone or in any combination thereof.

It is another object of the present invention to provide a new cane clip attachment which may be easily and efficiently manufactured and marketed.

It is a further object of the present invention to provide a new cane clip attachment which is of a durable and reliable construction.

An even further object of the present invention is to provide a new cane clip attachment which is susceptible of a low cost of manufacture with regard to both materials and labor, and which accordingly is then susceptible of low prices of sale to the consuming public, thereby making such cane clip attachment economically available to the buying public.

Still yet another object of the present invention is to provide a new cane clip attachment which provides in the apparatuses and methods of the prior art some of the advantages thereof, while simultaneously overcoming some of the disadvantages normally associated therewith.

Still another object of the present invention is to provide a new cane clip attachment for securing a cane to a user's clothing when not using the cane.

Yet another object of the present invention is to provide a new cane clip attachment which includes a clip member being adapted to be attached to a cane and being adapted to clip upon clothing of a user; and also includes cane-attaching members for attaching the clip member to the cane.

Still yet another object of the present invention is to provide a new cane clip attachment that is easy and convenient to use.

Even still another object of the present invention is to provide a new cane clip attachment that allows the user ready access to one's cane without having to bend down to pick of the cane from the ground which could cause someone to trip.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
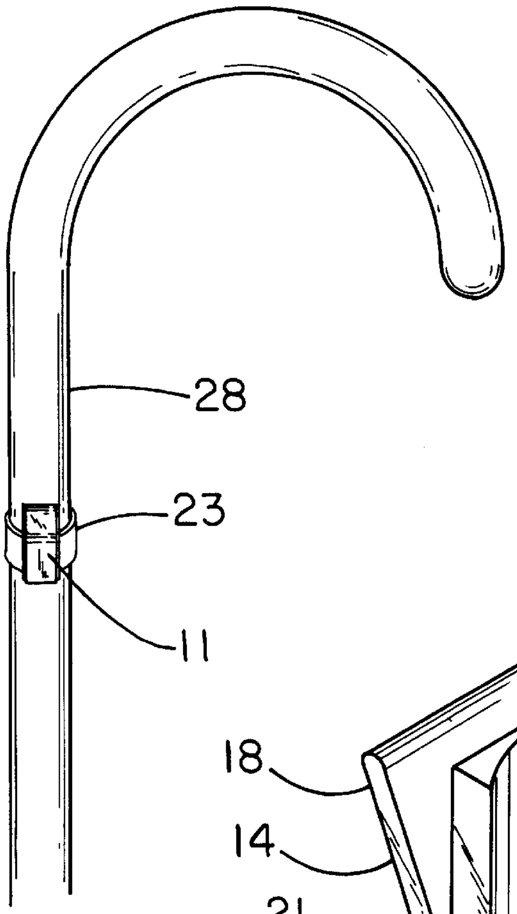
FIG. 1 is a side elevational view of a new cane clip attachment according to the present invention.
Figure 2:
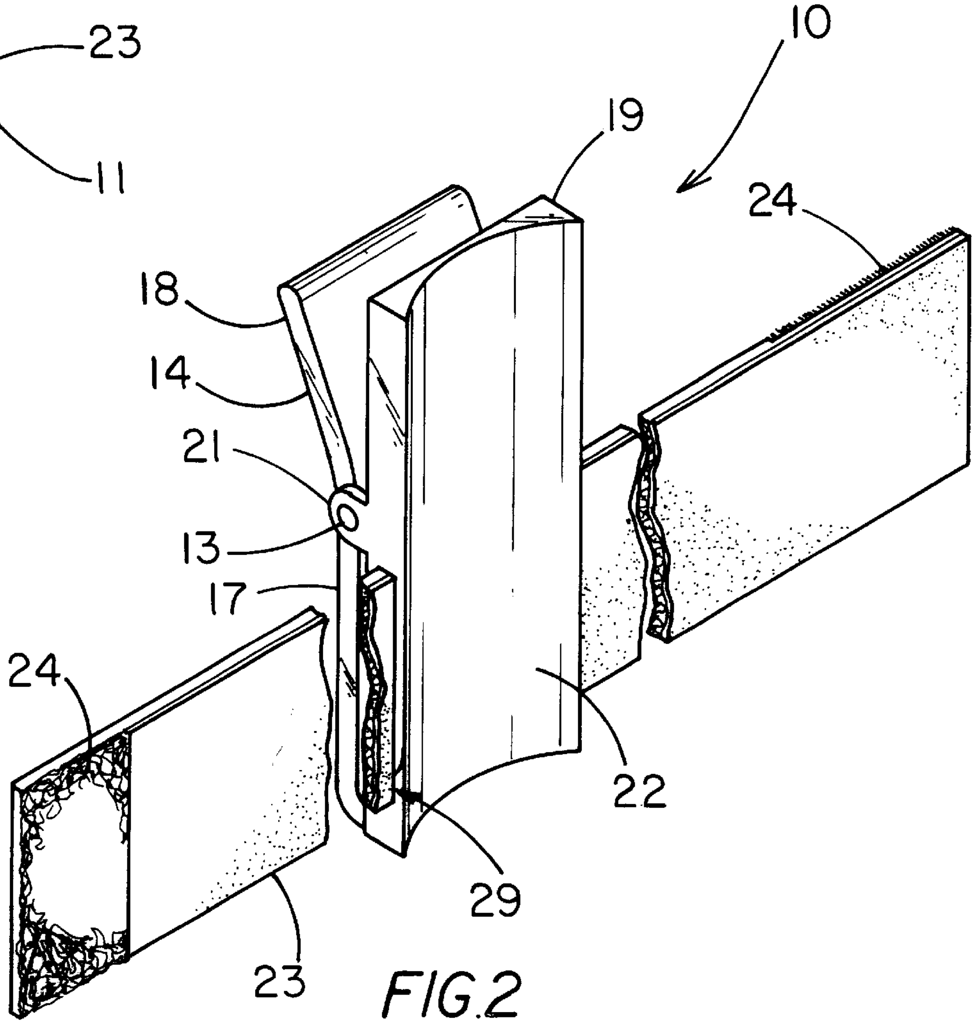
FIG. 2 is a perspective view of the present invention.
Figure 3:
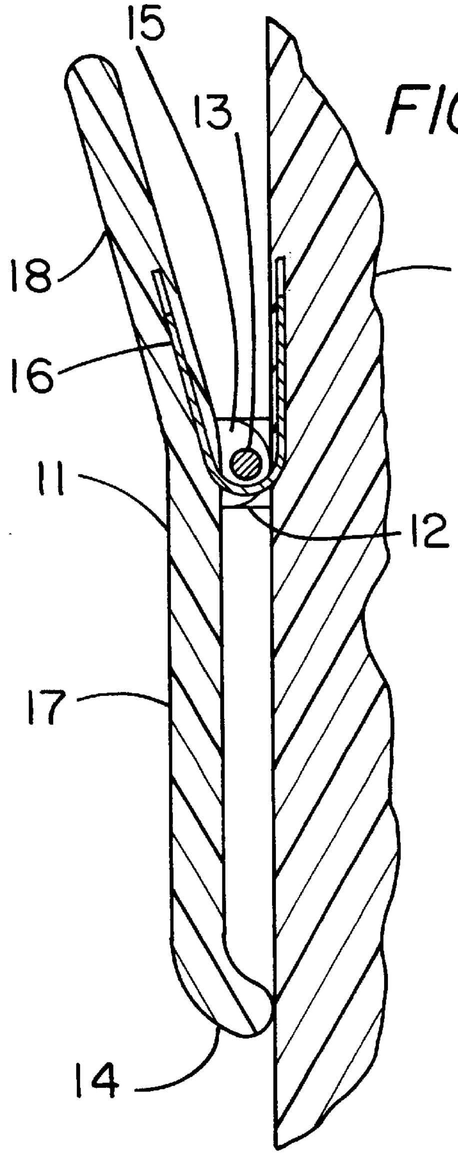
FIG. 3 is a side cross-sectional view of a second embodiment of the present invention.
Figure 5:
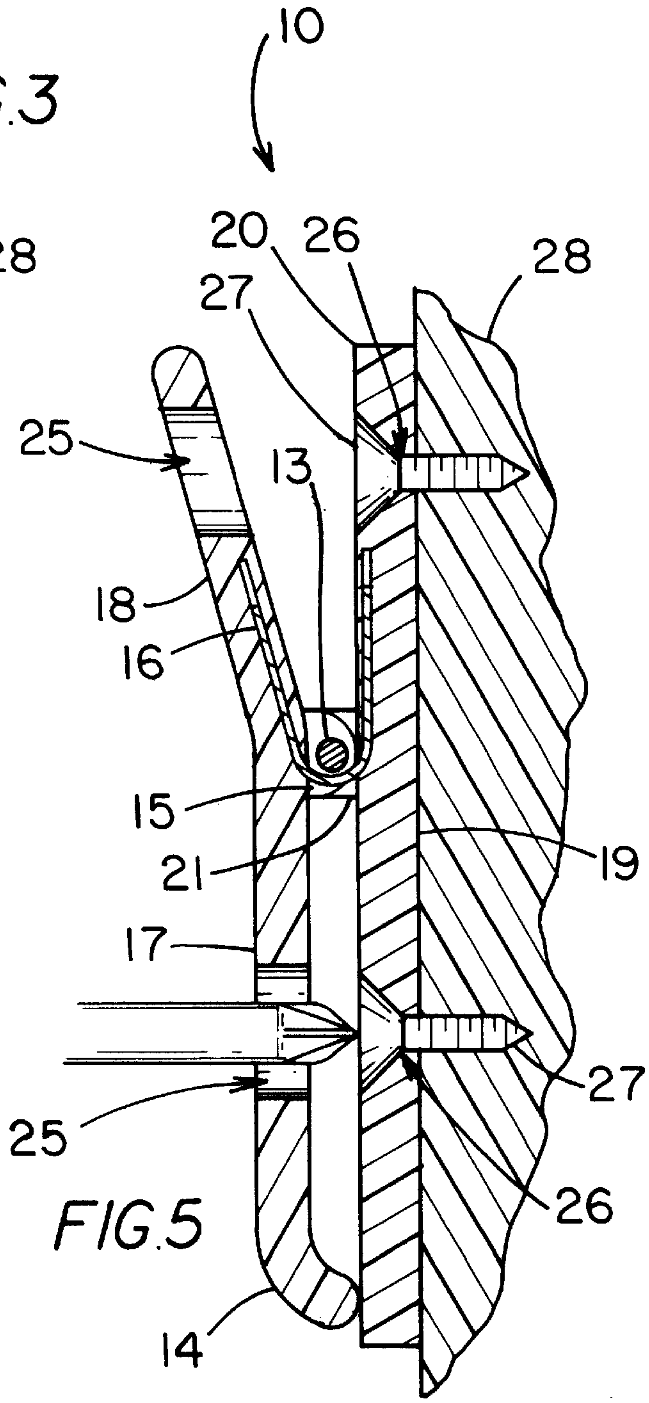
FIG. 5 is a side cross-sectional view of the third embodiment of the present invention.
Figure 4:
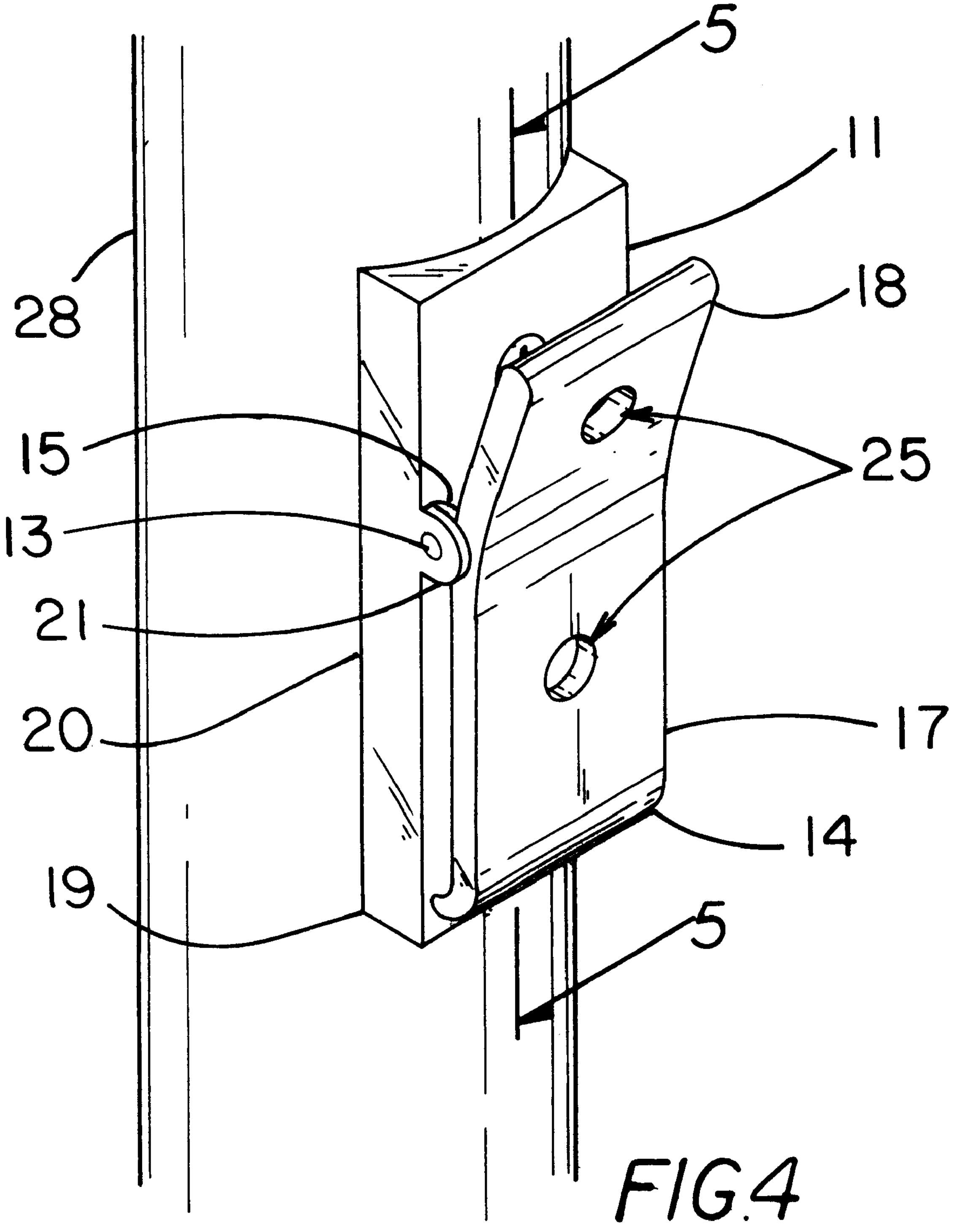
FIG. 4 is a perspective view of a third embodiment of the present invention.

With reference now to the drawings, and in particular to FIGS. 1 through 5 thereof, a new cane clip attachment embodying the principles and concepts of the present invention and generally designated by the reference numeral 10 will be described.

As best illustrated in FIGS. 1 through 5, the cane clip attachment 10 generally comprises a clip member 11 being adapted to be attached to a cane 28 and being adapted to clip upon clothing of a user; and also comprises a means for attaching the clip member 11 to the cane 28. As a second embodiment, the clip member 11 includes bracket members 12 being adapted to be conventionally attached to the cane 28, and also includes a pivot member 13 being conventionally mounted to the bracket members 12, and further includes a first jaw member 14 having lug members 15 being pivotally mounted to the pivot member 13, and also includes a spring member 16 for biasing the first jaw member 14 toward the cane 28. The first jaw member 14 includes an elongate main portion 17 and a lever portion 18 which is angled relative to the elongate main portion 17.

As a first embodiment, the clip member 11 includes the first jaw member 14 and a second jaw member 19 being hingedly attached to the first jaw member 14 and being adapted to be removably secured to the cane 28. Each of the first and second jaw members 14,19 includes an elongate main portion 17,20 and also includes lug members 15,21 being conventionally attached along side edges of the elongate main portion 17,20 with the lug members 15 of the first jaw member 14 being pivotally and biasedly attached to the lug members 21 of the second jaw member 19. The first jaw member 14 further includes the lever portion 18 which is angled relative to the elongate main portion 17 thereof. The clip member 11 further includes a spring member 16 being conventionally attached to the first and second jaw members 14,19 for biasing the elongate main portion 17 of the first jaw member 14 toward the second jaw member 19. The elongate main portion 20 of the second jaw member 19 further includes a laterally beveled back surface 22 which is adapted to receive a portion of the cane 28 so that the second jaw member 19 fits flush to the cane 28. In addition, the second jaw member 19 includes a bore 29 extending laterally therethrough. The means for attaching the clip member 11 to the cane 28 includes a strap member 23 being removably disposed through the bore 29 of the second jaw member 19 and further includes strips of hook and loop fasteners 24 being conventionally attached at ends of the strap member 23 and being fastenable to one another about the cane 28.

As a third embodiment, the first and second jaw members 14,19 include holes 25,26 being disposed therethrough, and the means for attaching the clip member 11 to the cane 28 includes threaded fasteners 27 being received through the holes 25,26 of the first and second jaw members 14,19 and being adapted to be threaded into the cane 28.

In use, the user clips the clip member 11 upon the person's belt or clothing about the person's waist so that the person can keep track of one's cane 28 when not using it.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cane clip attachment comprising:

a clip member being adapted to be attached to a cane and being adapted to clip upon clothing of a user;

wherein said clip member includes a first jaw member and a second jaw member, said second jaw member being hingedly attached to said first jaw member and being adapted to be removably secured to the cane; and a means for attaching said clip member to the cane.

2. A cane clip attachment as described in claim 1, wherein each of said first and second jaw members includes an elongate main portion and also includes lug members being attached along side edges of said elongate main portion with said lug members of said first jaw member being pivotally and biasedly attached to said lug members of said second jaw member, said first jaw member further including a lever portion which is angled relative to said elongate main portion thereof.

3. A cane clip attachment as described in claim 2, wherein said clip member further includes a spring member being attached to said first and second jaw members for biasing said elongate main portion of said first jaw member toward said second jaw member.

4. A cane clip attachment as described in claim 3, wherein said elongate main portion of said second jaw member further includes a laterally beveled back surface which is adapted to receive a portion of the cane so that said second jaw member fits flush to the cane, said second member also including a bore extending laterally through said elongate main portion thereof.

5. A cane clip attachment as described in claim 4, wherein said means for attaching said clip member to the cane includes a strap member being removably disposed through said bore of said second jaw member and further includes strips of hook and loop fasteners being attached at ends of said strap member and being fastenable to one another about the cane.

6. A cane clip attachment as described in claim 4, wherein said first and second jaw members further include holes being disposed therethrough.

7. A cane clip attachment as described in claim 6, wherein said means for attaching said clip member to the cane include threaded fasteners being received through said holes of said first and second jaw members and being adapted to be threaded into the cane.

8. A cane clip attachment comprising:

a clip member being adapted to be attached to a cane and being adapted to clip upon clothing of a user, said clip member including a first jaw member and a second jaw member being hingedly attached to said first jaw member and being adapted to be removably secured to the cane, each of said first and second jaw members including an elongate main portion and also includes lug members being attached along side edges of said elongate main portion with said lug members of said first jaw member being pivotally and biasedly attached to said lug members of said second jaw member, said first jaw member further including a lever portion which is angled relative to said elongate main portion thereof, said clip member further including a spring member being attached to said first and second jaw members for biasing said elongate main portion of said first jaw member toward said second jaw member, said elongate main portion of said second jaw member further including a laterally beveled back surface which is adapted to receive a portion of the cane so that said second jaw member fits flush to the cane, said second member also including a bore extending laterally through said elongate main portion thereof; and a means for attaching said clip member to the cane.

9. A cane clip attachment as described in claim 8, wherein said means for attaching said clip member to the cane includes a strap member being removably disposed through said bore of said second jaw member and further includes strips of hook and loop fasteners being attached at ends of said strap member and being fastenable to one another about the cane.

10. A cane clip attachment as described in claim 8, wherein said first and second jaw members further include holes being disposed therethrough, said means for attaching said clip member to the cane including threaded fasteners being received through said holes of said first and second jaw members and being adapted to be threaded into the cane.

11. A cane clip attachment comprising:

a clip member being adapted to be attached to a cane and being adapted to clip upon clothing of a user; and a means for attaching said clip member to the cane, said clip member including bracket members being adapted to be attached to the cane, and also including a pivot member being mounted to said bracket members, and further including a first jaw member having lug members being pivotally mounted to said pivot member, and also including a spring member for biasing said first jaw member toward the cane.

12. A cane clip attachment as described in claim 11, wherein said first jaw member includes an elongate main portion and a lever portion which is angled relative to said elongate main portion.

* * * * *